United States Patent
Chen et al.

(10) Patent No.: US 10,139,866 B2
(45) Date of Patent: Nov. 27, 2018

(54) FLEXIBLE HOUSING

(71) Applicant: ASUSTEK COMPUTER INC., Taipei (TW)

(72) Inventors: Yi-Ting Chen, Taipei (TW); Tsung-Ju Chiang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/866,541

(22) Filed: Jan. 10, 2018

(65) Prior Publication Data

US 2018/0210494 A1    Jul. 26, 2018

(30) Foreign Application Priority Data

Jan. 23, 2017 (TW) .............................. 106102336 A

(51) Int. Cl.
*G06F 1/16* (2006.01)
*A45C 11/00* (2006.01)

(52) U.S. Cl.
CPC ............ *G06F 1/166* (2013.01); *G06F 1/1607* (2013.01); *G06F 1/1626* (2013.01); *G06F 1/1628* (2013.01); *A45C 2011/002* (2013.01); *A45C 2011/003* (2013.01); *G06F 2200/1633* (2013.01)

(58) Field of Classification Search
CPC combination set(s) only.
See application file for complete search history.

(56) References Cited

U.S. PATENT DOCUMENTS

| | | | |
|---|---|---|---|
| 8,134,829 B2* | 3/2012 | Clark ................... | G06F 1/1681 16/382 |
| 8,143,982 B1* | 3/2012 | Lauder ................. | G06F 1/1626 206/320 |
| 8,253,518 B2* | 8/2012 | Lauder ................. | G06F 1/1647 206/320 |
| 8,264,310 B2* | 9/2012 | Lauder ................. | G06F 1/1613 335/219 |
| 8,640,864 B2* | 2/2014 | Chen ..................... | G06F 1/1626 206/320 |
| 8,648,679 B2* | 2/2014 | Lauder ..................... | H01F 7/04 206/320 |
| 8,665,044 B2* | 3/2014 | Lauder ................. | G06F 1/1626 206/320 |
| 8,724,300 B2* | 5/2014 | Smith ................... | G06F 1/1628 206/320 |
| 8,872,023 B2* | 10/2014 | Chang .................. | G06F 1/1626 174/50 |

(Continued)

FOREIGN PATENT DOCUMENTS

CN    203789350 U    8/2014
TW    M483644 U    8/2014

*Primary Examiner* — Lisa Lea Edmonds
(74) *Attorney, Agent, or Firm* — Bacon & Thomas, PLLC

(57) ABSTRACT

A flexible housing is provided in the present disclosure. The flexible housing includes a base and a flexible sheet. The base includes a first side and a second side. The first side is configured to be connected to an electronic device. The second side is divided into a first area and a second area via a hypothetical axis. The flexible sheet is configured to cover the second side and includes a part fixed to the first area and a part facing the second area. When the part of the flexible sheet facing the second area is away from the second side, the flexible sheet is bent to form a curved surface.

10 Claims, 12 Drawing Sheets

(56) References Cited

U.S. PATENT DOCUMENTS

| | | | |
|---|---|---|---|
| 8,878,637 B2* | 11/2014 | Sartee | G06F 1/16 335/219 |
| 8,884,730 B2* | 11/2014 | Lauder | H01F 7/04 206/320 |
| 8,928,437 B2* | 1/2015 | Lauder | G06F 1/1626 206/320 |
| 8,942,773 B2* | 1/2015 | Wu | A45C 11/00 206/320 |
| 8,975,991 B2* | 3/2015 | Lauder | H01F 7/04 335/219 |
| 9,010,529 B2* | 4/2015 | Chen | G06F 1/1626 206/320 |
| 9,565,909 B2* | 2/2017 | Song | A45C 11/00 |
| 2012/0106054 A1* | 5/2012 | Royz | F16M 11/10 361/679.3 |
| 2012/0188693 A1* | 7/2012 | Chiang | F16M 11/10 361/679.01 |
| 2012/0194448 A1* | 8/2012 | Rothkopf | A45C 13/002 345/173 |
| 2012/0287562 A1* | 11/2012 | Wu | G06F 1/1626 361/679.01 |
| 2013/0032432 A1* | 2/2013 | Slotta | H05K 5/02 181/199 |
| 2014/0118897 A1* | 5/2014 | Chen | F28F 13/14 361/679.01 |
| 2015/0138697 A1* | 5/2015 | Murauyou | G06F 1/1681 361/679.01 |
| 2016/0334052 A1* | 11/2016 | Wu | F16M 13/005 |

* cited by examiner

FLEXIBLE HOUSING

CROSS-REFERENCE TO RELATED APPLICATION

This application claims the priority benefit of TW application serial No. 106102336, filed on Jan. 23, 2017. The entirety of the above-mentioned patent application is hereby incorporated by references herein and made a part of specification.

BACKGROUND OF THE INVENTION

Field of the Invention

The disclosure relates to a housing and, more specifically, to a flexible housing.

Description of the Related Art

With the development of science and technology, electronic devices such as mobile phones, tablet computers, notebook computers, electronic books, and portable multimedia players are widely used. A holder is often configured to the electronic device to provide an angle for users to operate conveniently.

BRIEF SUMMARY OF THE INVENTION

A flexible housing is provided in the disclosure. The flexible housing comprises a base and a flexible sheet. The base includes a first side and a second side. The first side is configured to be connected to an electronic device, and the second side is divided into a first area and a second area via a hypothetical axis. The flexible sheet is configured to cover the second side. The flexible sheet includes a part fixed to the first area and a part facing the second area. When the part of the flexible sheet facing the second area departs from the second side, the flexible sheet is bent to form a curved surface.

Therefore, the flexible housing can stand to support the electronic device, and then users can view or operate the electronic device conveniently.

DETAILED DESCRIPTION OF THE EMBODIMENTS

These and other features, aspects, and advantages of the present invention will become better understood with regard to the following description, appended claims, and accompanying drawings. However, the invention is not limited to the embodiments. The description of the operation of components is not used for limiting the execution sequence. Any equivalent device with the combination according to the disclosure of the invention is in the scope of the invention. The components shown in figures are not used for limit the size or the proportion. The same or similar number denotes the same or similar components.

Figure 1A:
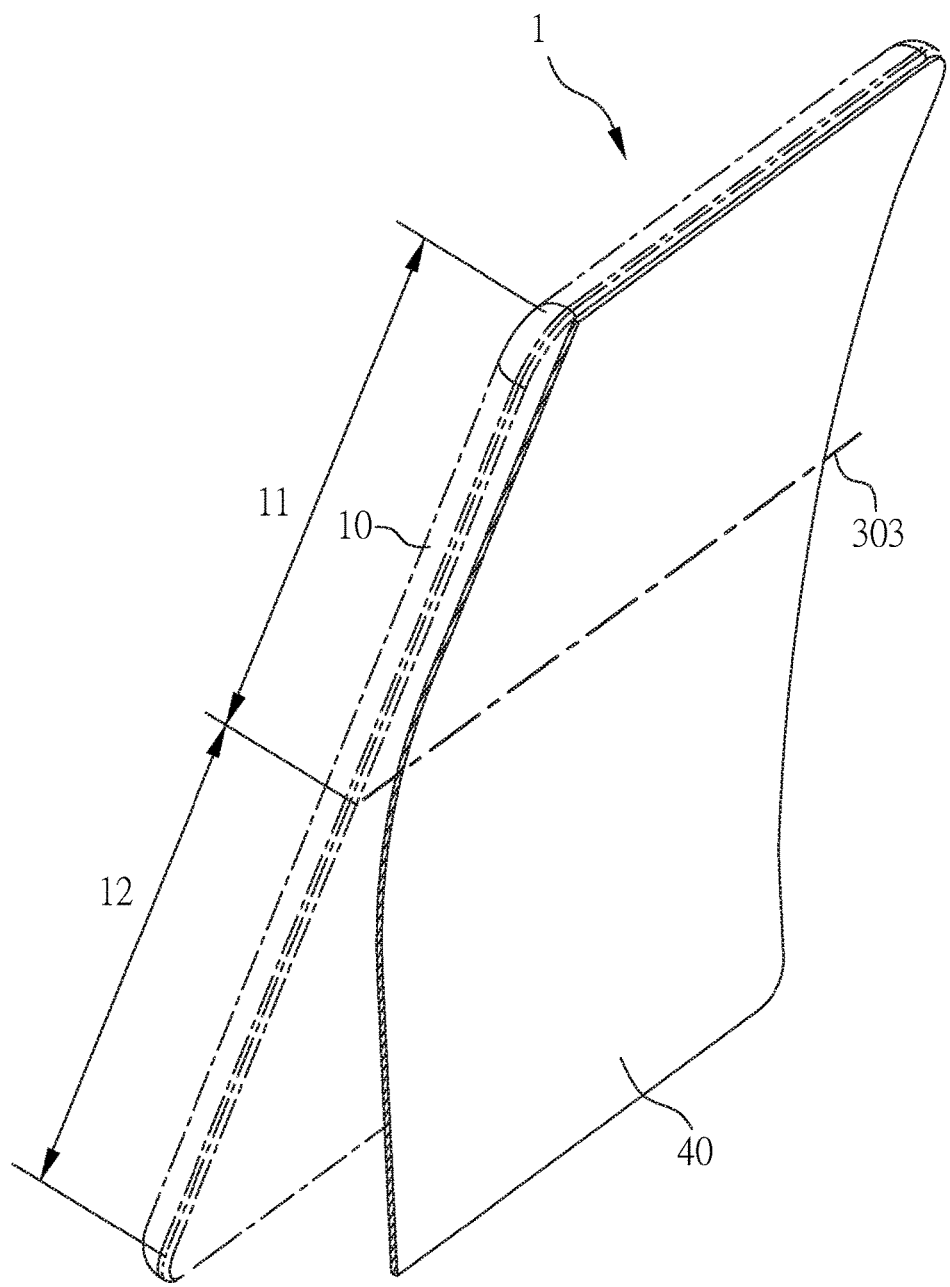
FIG. 1A is a schematic diagram showing a flexible housing according to a first embodiment.

FIG. 1A shows a flexible housing 1 according to a first embodiment. In the embodiment, a flexible housing 1 includes a base 10 and a flexible sheet 40.

Figure 3:
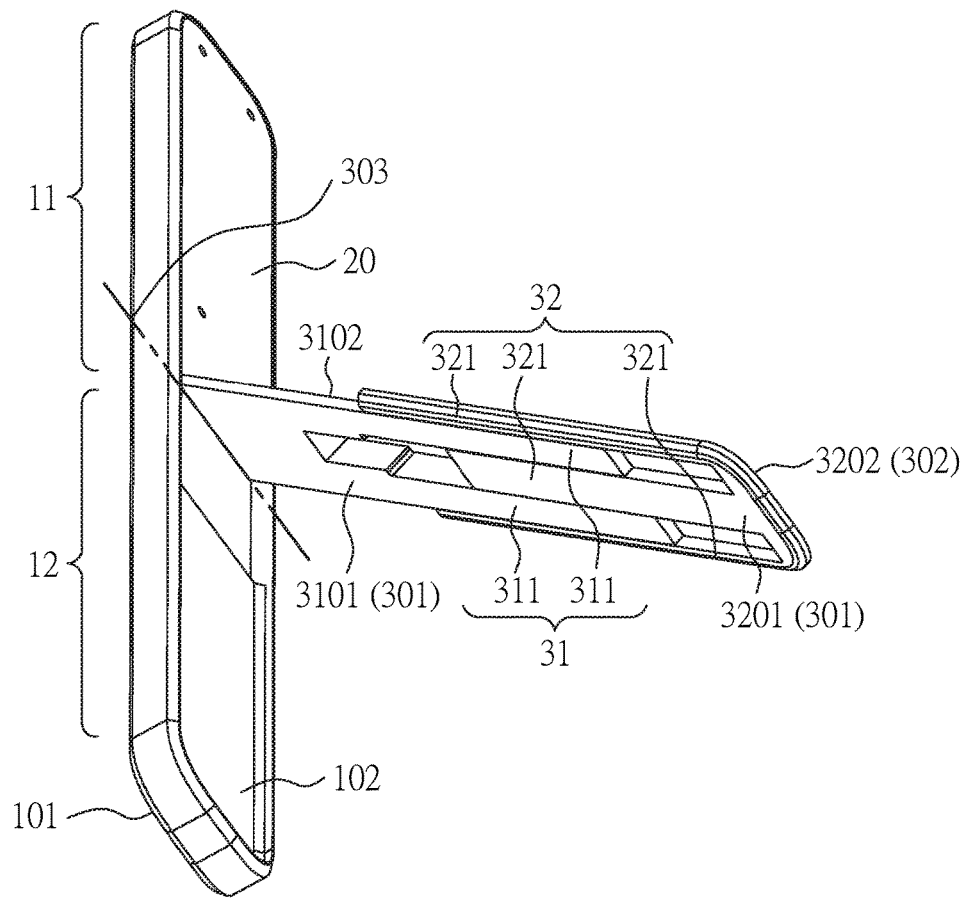
FIG. 3 is a schematic diagram showing a flexible housing according to a third embodiment.
Figure 11:
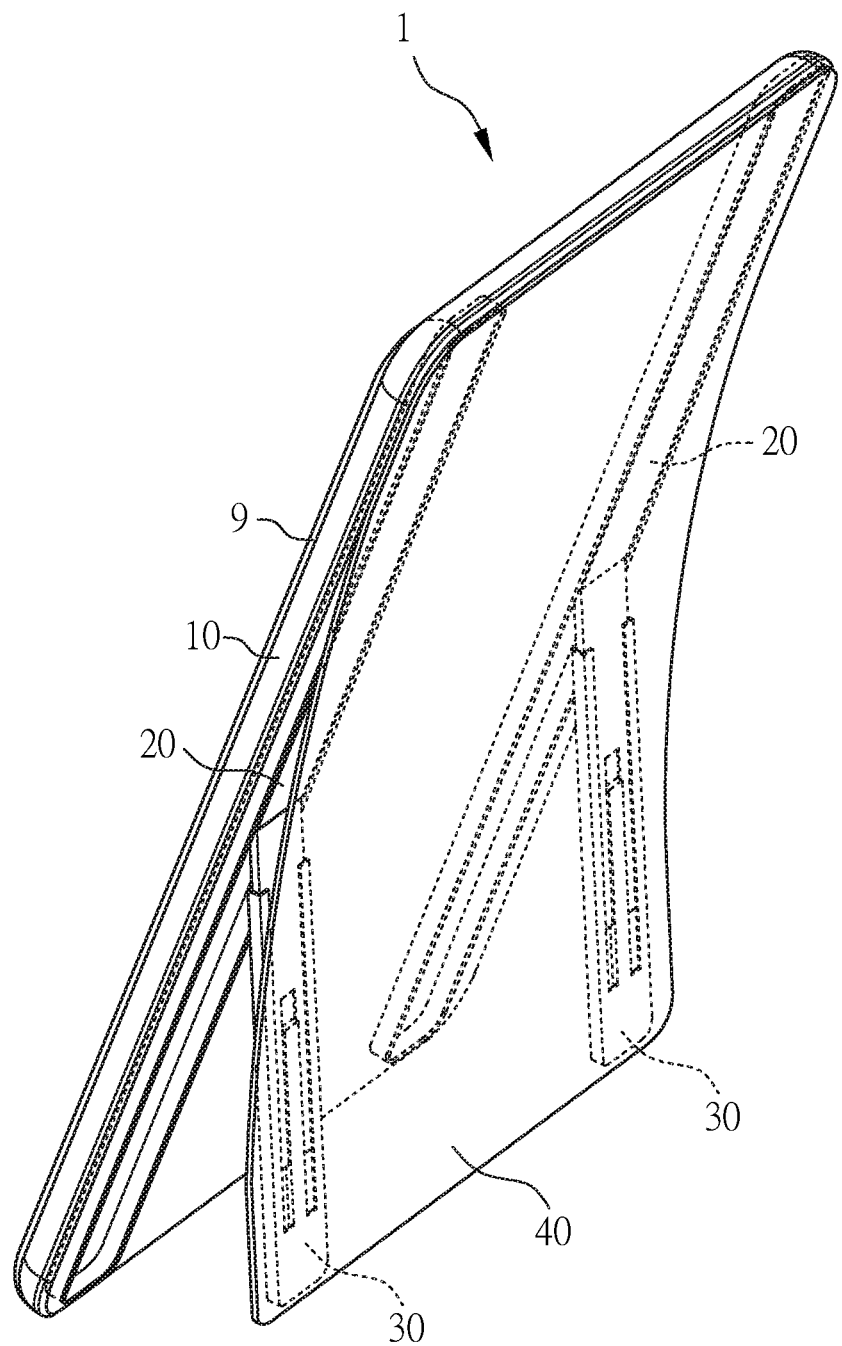
FIG. 11 is a schematic diagram showing an application of a flexible housing according to an embodiment.

The base 10 is made of a material such as metal, glass, plastic or acryl. As shown in FIG. 3, the base 10 includes a first side 101 and a second side 102. The first side 101 is used to be connected to an electronic device 9 (as shown in FIG. 11). The second side is divided into a first area 11 and a second area 12 via a hypothetical axis 303.

The flexible sheet 40 is made of a material which is adapted to be bent to form a curved plane, such as plastic, silicone, rubber, cloth, leather, synthetic leather, and paper. Preferably, the material is elastic and stretchable. The flexible sheet 40 covers the second side 102 and includes a part fixed to the first area 11 and a part facing the second area 12.

When the part of the flexible sheet 40 facing the second area 12 is away from the second side 102, the flexible sheet 40 is bent to form a curved plane. Then, the flexible housing 1 supports the electronic device to be viewed or operated by a user.

Figure 1B:
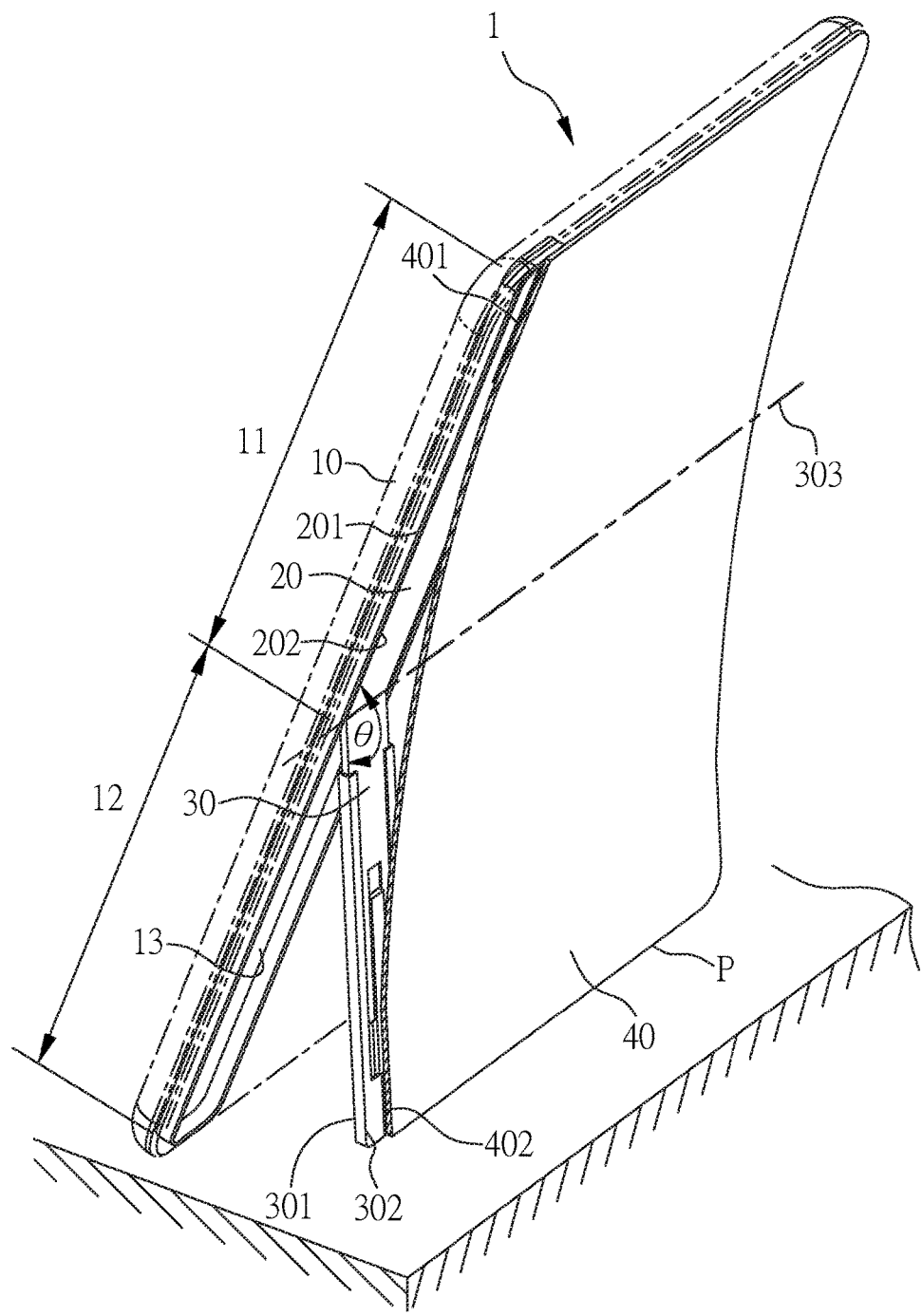
FIG. 1B is a schematic diagram showing a flexible housing with a fixing part and a sliding part according to a first embodiment.

As shown in FIG. 1B, the flexible housing 1 further includes a fixing part 20 and a sliding part 30. In an embodiment, the base 10 includes a recess 13 to hold the fixing part 20 and the sliding part 30. Thus, the thickness of the flexible housing 1 is decreased.

In an embodiment, the fixing part 20 and the sliding part 30 are made of a rigid material such as glass, plastic or acryl, one or an alloy of copper, iron, aluminum, stainless steel. The rigid sheet can provide strong support. Moreover, the thickness of the flexible housing 1 can be decreased.

The fixing part 20 includes a first surface 201 and a second surface 202. The fixing part 20 is fixed to the first area 11 of the base 10 via the first surface 201.

The sliding part 30 includes a first surface 301 and a second surface 302. The first surface 301 of the sliding part 30 faces the second area 12 of the base 10. The sliding part 30 rotates relative to the fixing part 20 around the hypothetical axis 303. Therefore, the first surface 301 of the sliding part 30 contacts the second area 12 of the base 10 in a closing state or gets away from the second area 12 of the base 10 in a standing state. As shown in FIG. 1B, the sliding part 30 stands at an angle θ to support the electronic device at a supporting point P. In an embodiment, the electronic device is a mobile phone, a tablet computer a notebook computer.

The flexible sheet 40 is connected to the second surface 202 of the fixing part 20 and the second surface 302 of the sliding part 30. In an embodiment, the connection way is adhesion, magnetic attraction, fastening and clamping, which is not limited herein.

In the embodiment, part of the flexible sheet 40 is adhered to the second surface 202 of the fixing part 20 and the second surface 302 of the sliding part 30. For example, an edge 401 of the flexible sheet 40 is adhered to the fixing part 20, and an edge 402 is adhered to the sliding part 30. In the first embodiment, the sliding part 30 is rotated relative to the fixing part 20 via the flexible sheet 40. When the sliding part 30 is away from the second area 12 relative to the fixing part 20, the flexible sheet 40 is bent to form a curved surface.

In the embodiments, the flexible housing 1 supports the electronic device for the user to view or operate the electronic device. The flexible sheet 40 covers the seam between the fixing part 20 and the sliding part 30. The flexible sheet 40 is bent to form a curved surface when the flexible housing 1 stands. Therefore, the flexible housing 1 has a smooth appearance. It can protect hands from being hurt. Moreover, the flexible sheet 40 is artistic and durable.

Figure 2:
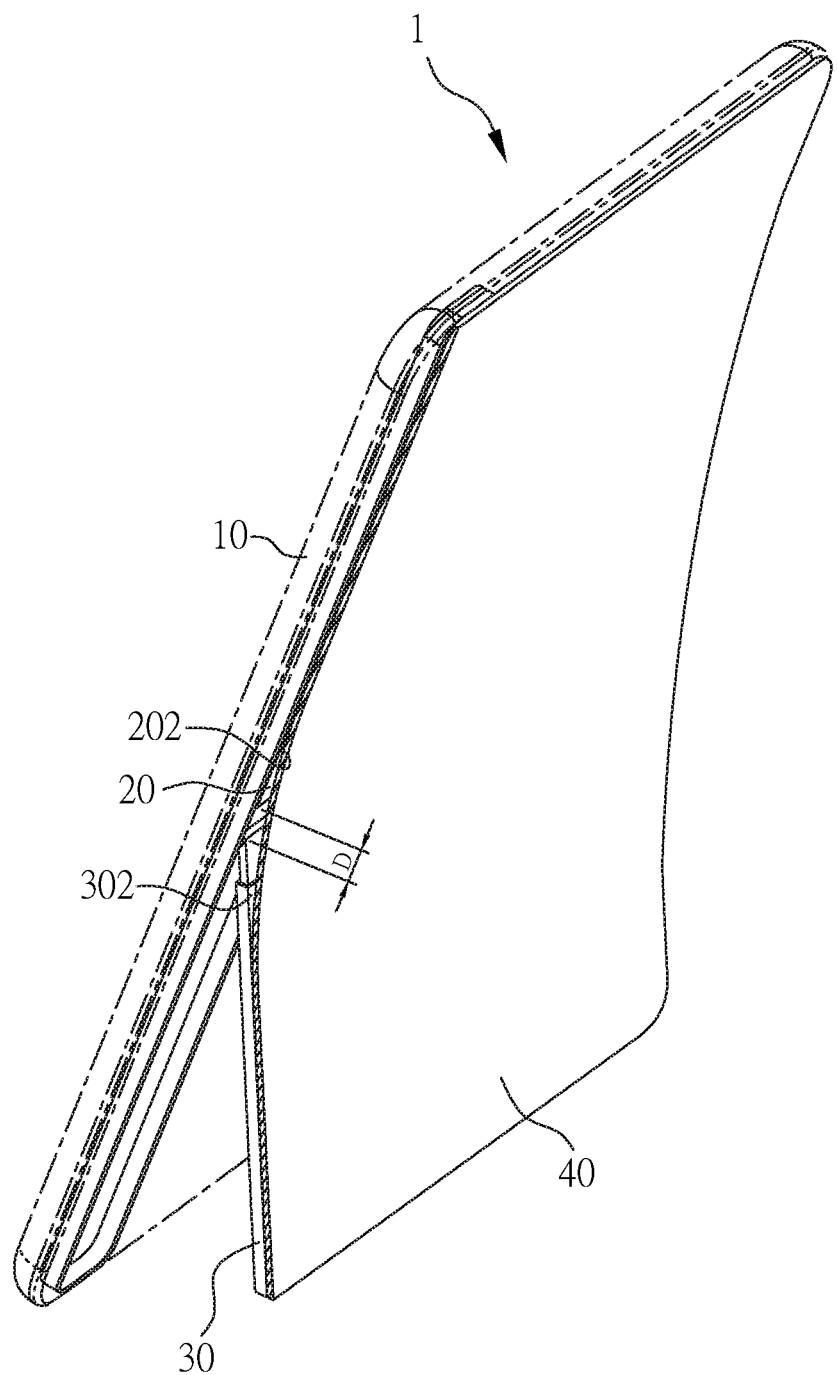
FIG. 2 is a schematic diagram showing a flexible housing according to a second embodiment.

FIG. 2 shows a flexible housing 1 according to a second embodiment. The difference between the first embodiment and the second embodiment is that a distance D is between the fixing part 20 and sliding part 30 in the second embodiment, to allow the flexible sheet 40 to be bent to form a curved surface. In the second embodiment, with the distance D, more part of the flexible sheet 40 is adhered to the second surface 202 of the fixing part 20 and the second surface 302 of the sliding part 30. Therefore, the adhered part of the flexible sheet 40 is more flat.

FIG. 3 shows a flexible housing 1 according to a third embodiment. The difference between the second embodiment and the third embodiment is that the sliding part 30 further includes a first sliding member 31 and a second sliding member 32 in the third embodiment.

In the third embodiment, the first sliding member 31 includes multiple sliding rails 311. The second sliding member 32 includes multiple sliding rods 321. In an embodiment, the second sliding member 32 is a rigid sheet to decrease the thickness of the flexible housing 1 and provide enough support. The sliding rails 311 match the multiple sliding rods 321 to allow that the second sliding member 32 is embedded into the first sliding member 31 and slides relative to the first sliding member 31.

The first sliding member 31 includes a first surface 3101 and a second surface 3102. The second sliding member 32 includes a first surface 3201 and a second surface 3202. In the third embodiment, the first surface 301 of the sliding part 30 includes the first surface 3101 of the first sliding member 31 and the first surface 3201 of the second sliding member 32. The second surface 302 of the sliding part 30 is the second surface 3201 of the second sliding member 32. The second surface 3102 of the first sliding member 31 is hidden behind a back 322 of the second sliding member.

In the first embodiment, the first surface 301 of the sliding part 30 faces the second area 12. In the third embodiment, the first surface 3101 of the first sliding member 31 and the first surface 3201 of the second sliding member 32 face the second area 12. In the first embodiment, the flexible sheet 40 is adhered to the second surface 302 of the sliding part 30. In the third embodiment, the flexible sheet 40 is adhered to the second surface 3202 of the second sliding member 32.

Figure 4:
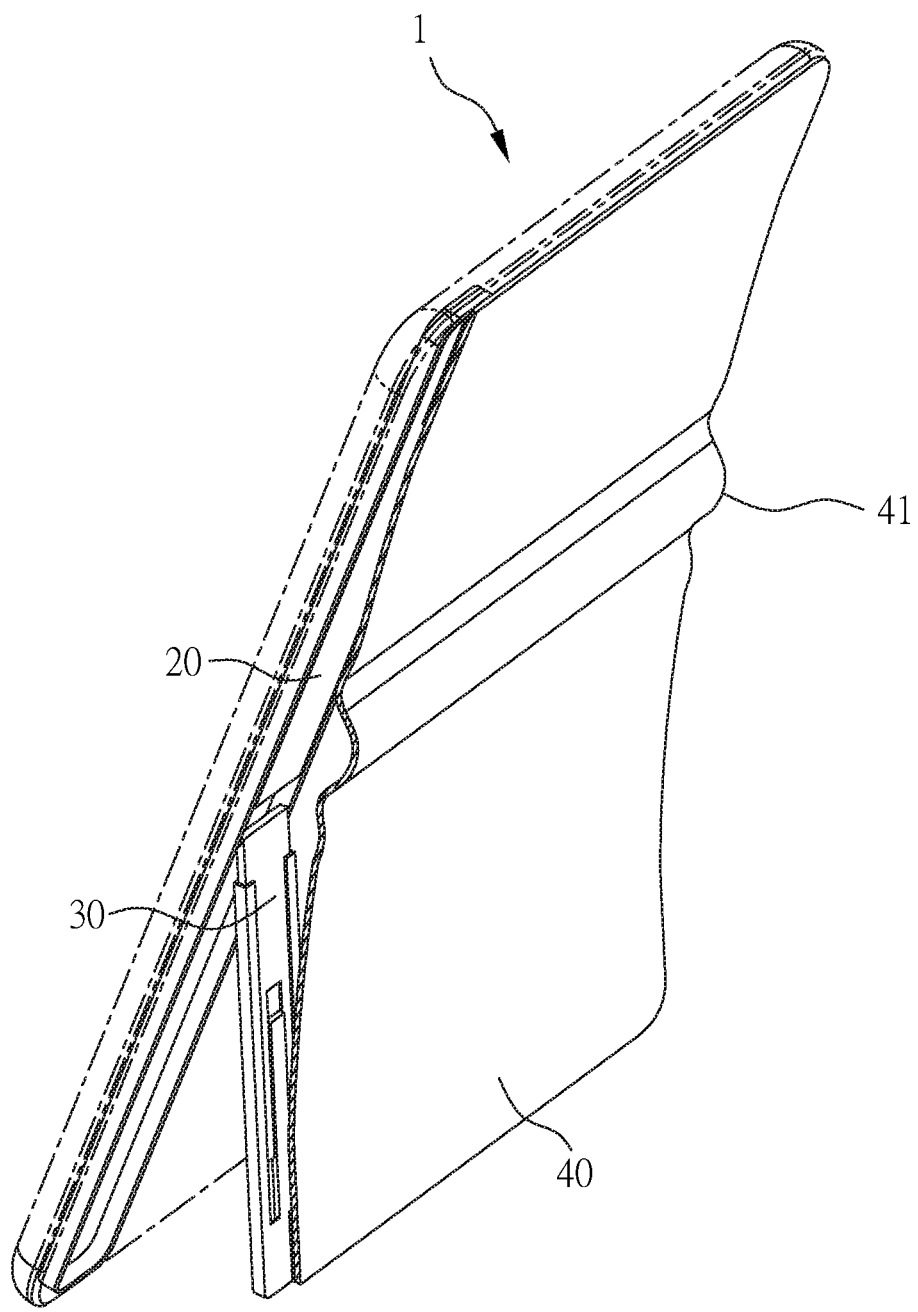
FIG. 4 is a schematic diagram showing a flexible housing with an irregular protrusion according to an embodiment.
Figure 5:
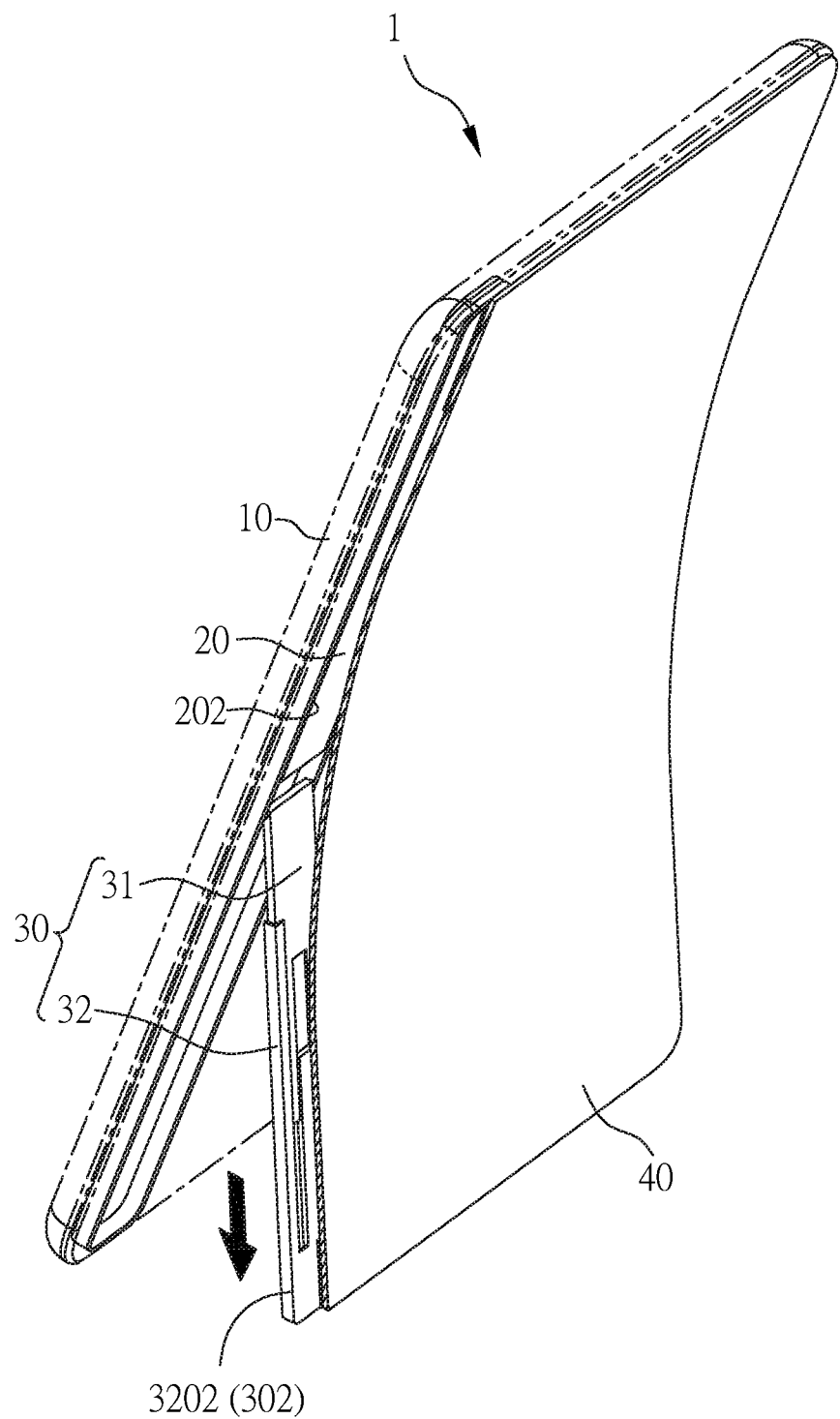
FIG. 5 is a schematic diagram showing a flexible housing according to an embodiment.

Please refer to FIG. 4 and FIG. 5, in the third embodiment, an irregular protrusion 41 is stretched to be flattened by sliding the first sliding member 31 and the second sliding member 32. Then, the flexible sheet 40 is flat. When the sliding part 30 rotates relative to the fixing part 20 and thus stands, since the second sliding member 32 slides at the first sliding member 31, the flexible sheet 40 is stretched. Then, the flexible sheet 40 contacts the second surface 202 of the fixing part 20 and the second surface 3202 of the second sliding member 32 flatly.

Figure 6:
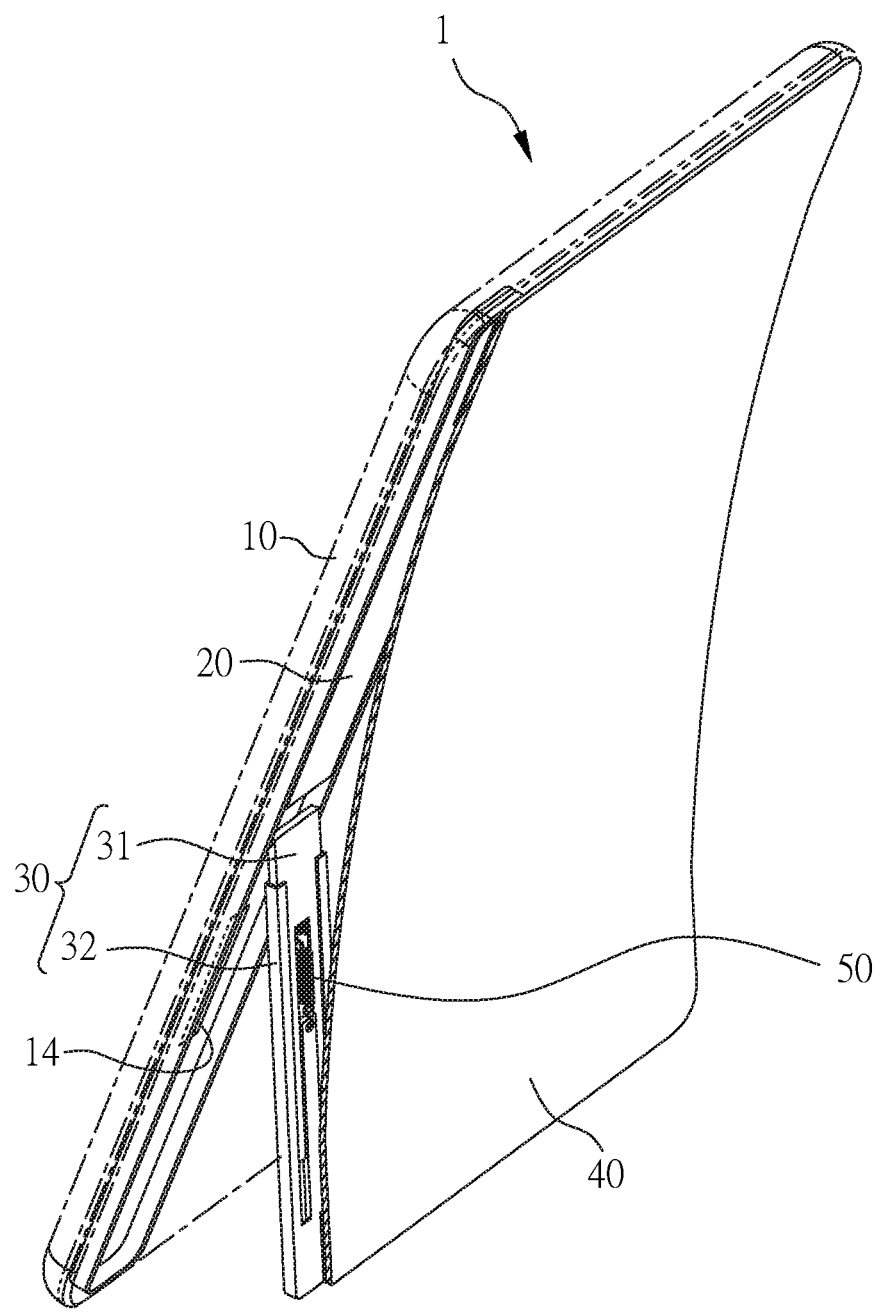
FIG. 6 is a schematic diagram showing a flexible housing according to a fourth embodiment.

FIG. 6 shows a flexible housing 1 according to a fourth embodiment. The difference between the third embodiment and the fourth embodiment is that the flexible housing 1 in the fourth embodiment further includes a buffer 50. The buffer 50 is connected to the first sliding member 31 and the second sliding member 32. For example, the buffer 50 is one or a combination of a spring, an elastic sheet, an elastic rubber, an elastic rope, a damper, which is not limited herein. In an embodiment, the base 10 includes a recess 14 to hold a buffer 50. Therefore, the thickness of the flexible housing 1 is decreased.

Figure 7:
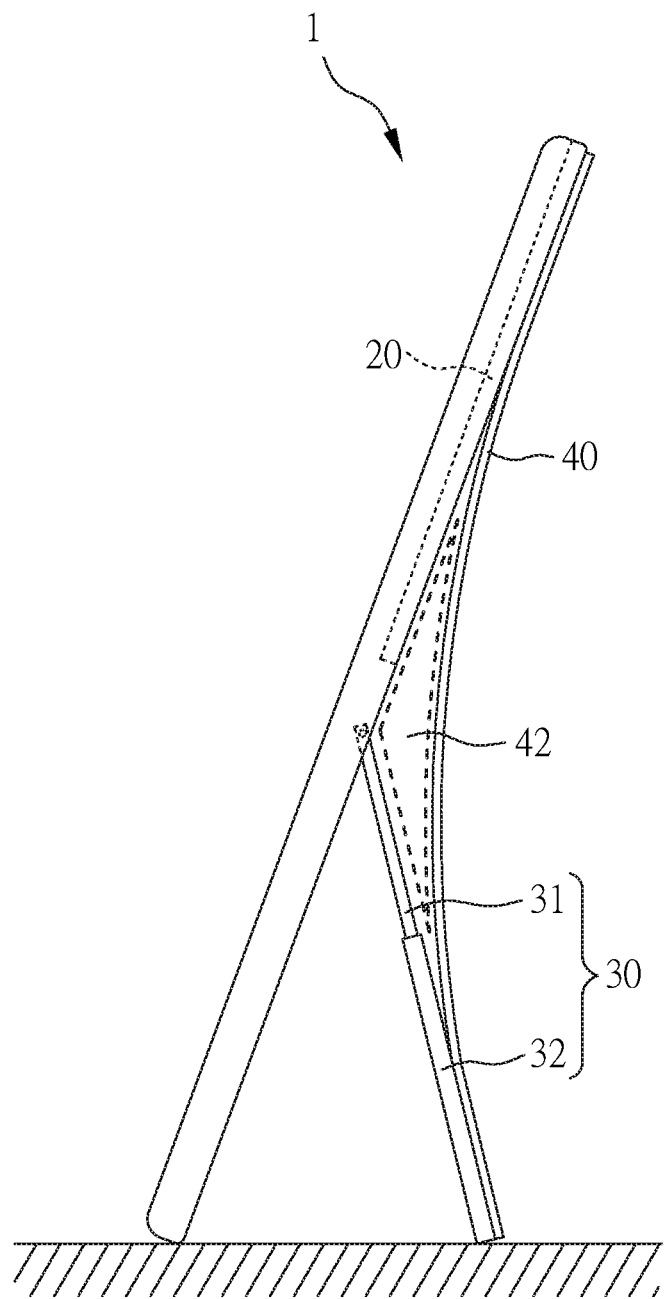
FIG. 7 is a schematic diagram showing a flexible housing according to an embodiment.

Since the flexible sheet 40 is adhered to the second surface 3201 of the second sliding member 32, the flexible sheet 40 pulls the second sliding member 32 to slide. As shown in FIG. 7, when the second sliding member 32 slides to a certain degree, a triangular prism space 42 is formed near the hypothetical axis 303 via the flexible sheet 40. At the time, the flexible sheet 40 is not flat. Therefore, the buffer 50 is connected between the first sliding member 31 and the second sliding member 32 to limit the sliding of the second sliding member 32.

Figure 8:
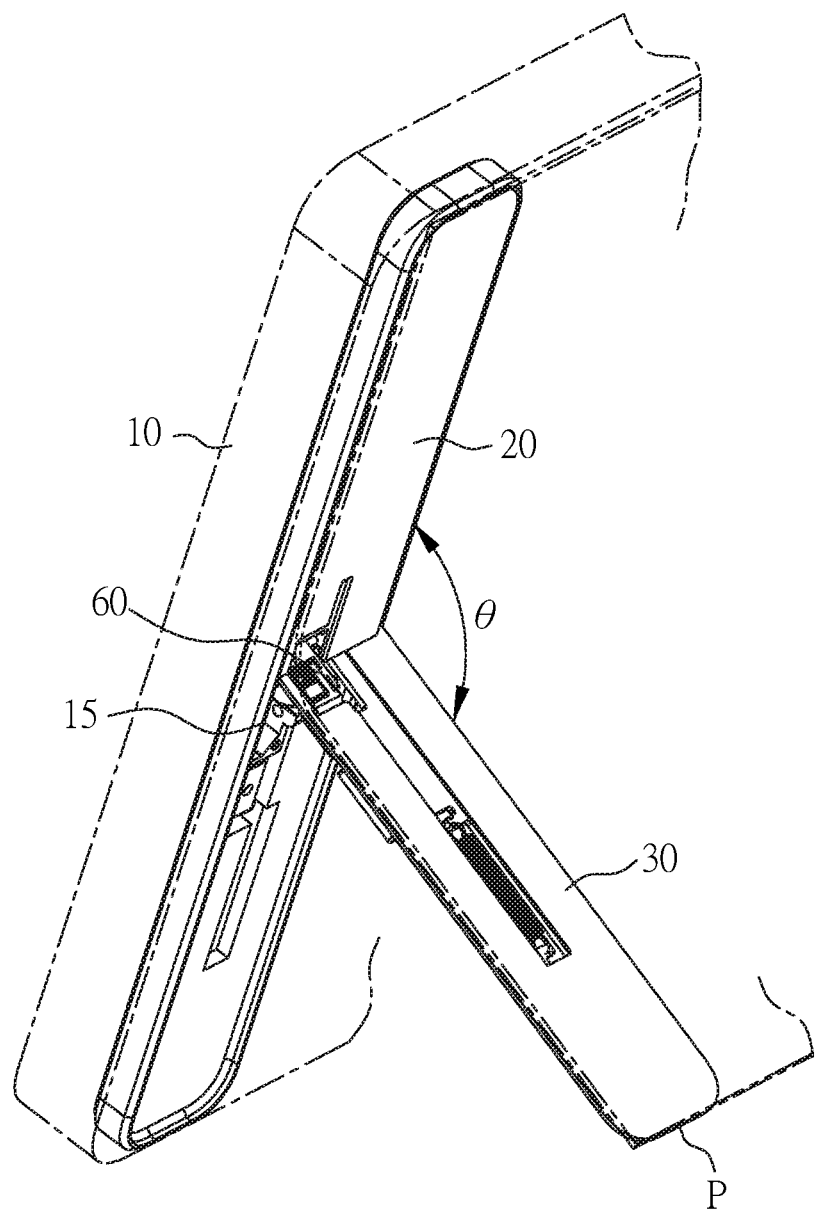
FIG. 8 and FIG. 9 are schematic diagrams showing a flexible housing according to a fifth embodiment.
Figure 9:
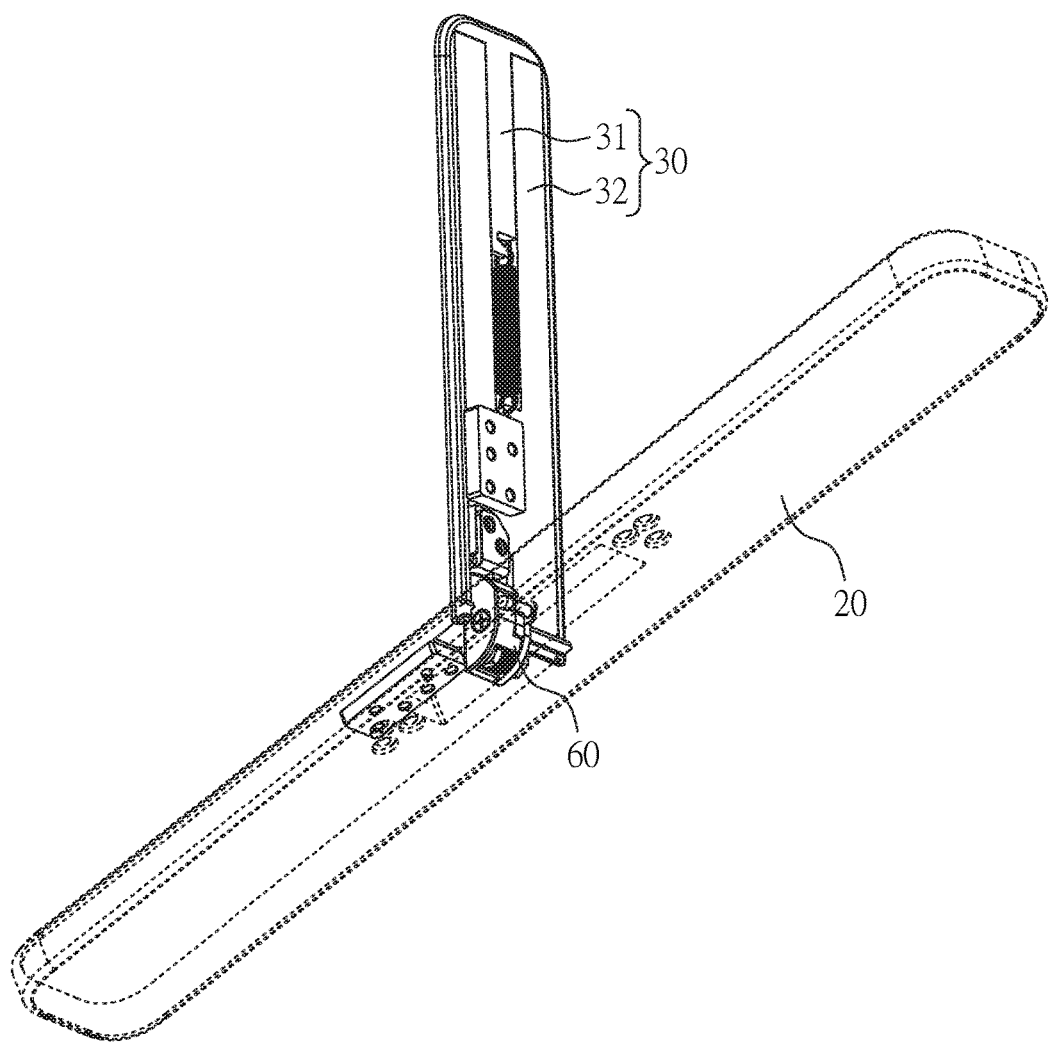

FIG. 8 and FIG. 9 show a flexible housing 1 according to a fifth embodiment. The difference between the third embodiment and the fifth embodiment is that the flexible housing 1 further includes a pivotal part 60 configured to be engaged and fixed. The pivotal part 60 is connected to the fixing part 20 and the first sliding member 32. The sliding part 30 rotates relative to the fixing part 20 due to the first sliding member 32. In an embodiment, the base 10 includes a recess 15 to hold the pivotal part 60. Then, the thickness of the flexible housing 1 is decreased.

In an embodiment, the pivotal part 60 includes an articulated shaft and an articulated sleeve. The articulated shaft includes elastic fastening parts arranged on a cylindrical surface of the articulated shaft at intervals. The articulated sleeve includes multiple recesses arranged at an inner surface of the articulated sleeve at intervals. When the articulated shaft rotates to a particular angle, the elastic fastening part is embedded into one of the multiple recesses to further limit the standing first sliding member 32 at a particular angle. When the first sliding member 32 is rotated, the elastic fastening part slides out of the recess to facilitate the rotate.

In the first embodiment, the sliding part 30 rotates relative to the fixing part 20 via the flexible sheet 40. However, in the fifth embodiment, the rotation is performed via the pivotal part 60. The pivotal part 60 is connected to the first sliding member 31 to lock a pivotal end of the sliding part 30. Therefore, the rotation angle of the sliding part 30 (that is the angle θ) is easily fixed. Moreover, when the sliding part 30 stands, the position of the supporting point P of the sliding part 30 is easily determined.

For example, the pivotal part 60 is a gear structure including a first pivotal portion and a second pivotal portion. The first pivotal portion is fixed to the fixing part 20 and includes a first gear. Similarly, the second pivotal portion is fixed to the first sliding member 31 and includes a second gear. The first gear is engaged with the second gear and rotates relatively. In the embodiment, the hypothetical axis is a rotational axis of the second gear. The second pivotal portion rotates relative to the first pivotal portion around the rotational axis of the second gear to drive the sliding part 30 to rotate relative to the fixing part 20 around the hypothetical axis.

Figure 10:
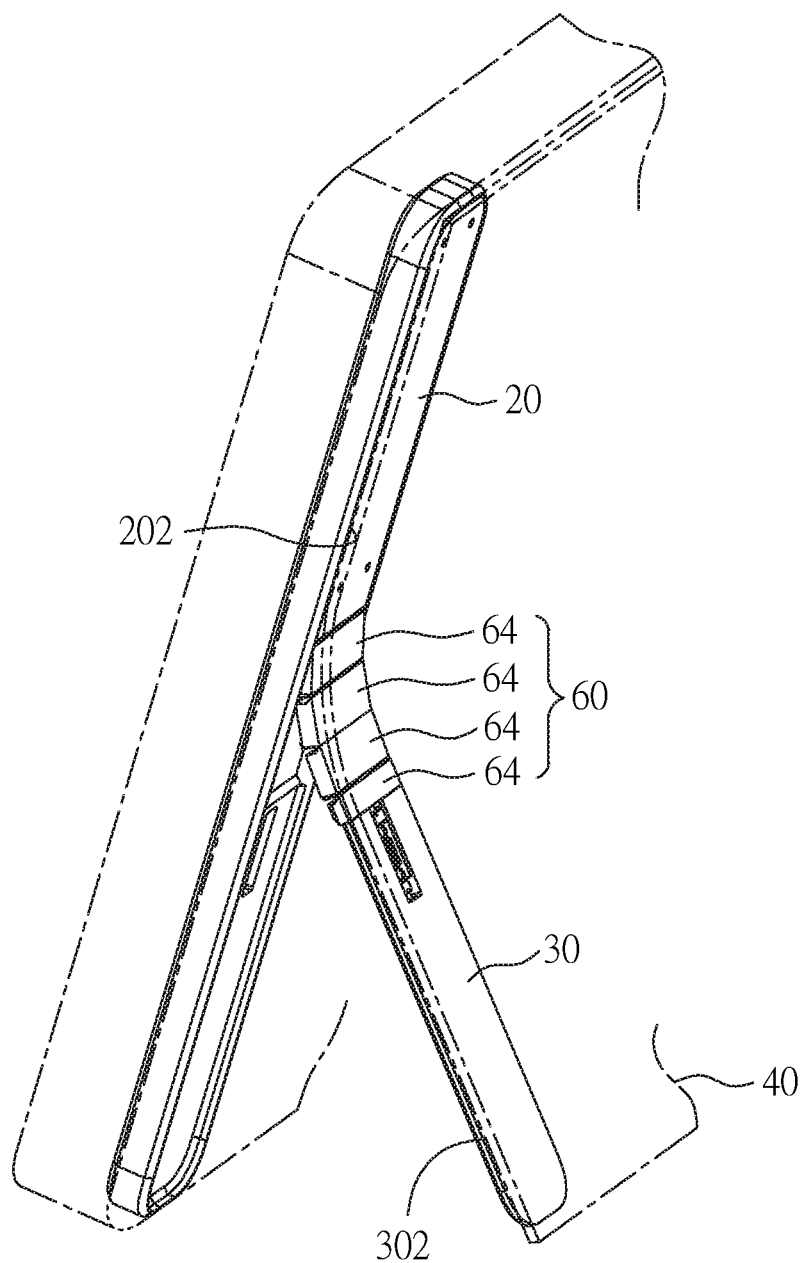
FIG. 10 is a schematic diagram showing a flexible housing according to a sixth embodiment.

FIG. 10 shows a flexible housing 1 according to a sixth embodiment. The difference between the fifth embodiment and the sixth embodiment is that the pivotal part 60 in the sixth embodiment is a multi-axial hinge. The pivotal part 60 is formed by connecting multiple hinges 64 in series.

As shown in FIG. 7, since an angle θ is formed between the fixing part 20 and the sliding part 30, a triangular prism space 42 is formed via the flexible sheet 40 near a cross between the fixing part 20 and the sliding part 30. At the time, the flexible sheet 40 is not flat. In contrast, in the sixth embodiment, as shown in FIG. 10, the flexible sheet 40 is bent along the multi-axial hinge. Therefore, the flexible sheet 40 does not easily generate protrusions. Then, the flexible sheet 40 contacts against the second surface 202 of the fixing part 20 and the second surface 302 of the sliding part 30 more flatly.

In an embodiment, since the fixing part 20 is fixed to the base 10, the fixing part 20 and the base 10 are integratedly formed. The thickness of the fixing part 20 is the same as that of the sliding part 30. As a result, when the sliding part 30 is in a closed state, the flexible sheet 40 is against the second surface 202 of the fixing part 20 and the second surface 302 of the sliding part 30 flatly.

FIG. 11 shows an application of a flexible housing according to an embodiment. As shown in FIG. 11, the flexible housing 1 is configured at two ends of the back of the electronic device 9. In another embodiment, the flexible housing 1 is configured at the center or other positions to support stably. The flexible sheet 40 extends from one end to another end. The area of the flexible sheet 40 is equal to or smaller than that of the back of the electronic device 9. In an embodiment, the base 10 is a part of the housing of the electronic device 9, and the flexible housing 1 is a component of the electronic device 9.

In sum, the flexible housing 1 in embodiments supports the electronic device 9. Thus, users easily view or operate the electronic device 9. The flexible sheet 40 covers the seam between the fixing part 20 and the sliding part 30. Moreover, the flexible sheet 40 is bent to form a curved surface when the flexible housing 1 stands. The flexible housing 1 has a smooth appearance, which can protect users from being hurt. Moreover, the flexible sheet 40 is artistic and durable.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A flexible housing, comprising:
    a base, including a first side and a second side, the first side is configured to be connected to an electronic device, the second side is divided into a first area and a second area via a hypothetical axis; and
    a flexible sheet, configured to cover the second side and including a part fixed to the first area and a part facing the second area;
    wherein when the part of the flexible sheet facing the second area is away from the second side, the flexible sheet is bent to form a curved surface.

2. The flexible housing according to claim 1, further comprising:
    a fixing part, including a first surface and a second surface, the first surface is connected to the first area;
    a sliding part located in the second area, including:
        a first sliding member, pivotally connected to the fixing part; and
        a second sliding member, slideably connected to the first sliding member;
    wherein the part of the flexible sheet fixed to the first area is connected to the second surface, and the part of the flexible sheet facing the second area is connected to the second sliding member, and when the sliding part rotates relative to the fixing part, the flexible sheet contacts against the second surface and the second sliding member flatly.

3. The flexible housing according to claim 2, wherein the first sliding member further includes multiple sliding rails, the second sliding member further includes multiple sliding rods matching the sliding rails, and the second sliding member is embedded into the first sliding member slideably.

4. The flexible housing according to claim 2, further comprising a buffer for connecting the first sliding member and the second sliding member.

5. The flexible housing according to claim 2, wherein the flexible housing further comprises a pivotal part pivotally connected to the fixing part and the first sliding member, and the pivotal part includes a structure configured to be engaged and fixed.

6. The flexible housing according to claim 5, wherein the pivotal part further comprises:
    a first pivotal portion, fixed to the fixing part, the first pivotal portion includes a first gear; and
    a second pivotal portion, fixed to the first sliding member, the second pivotal portion includes a second gear, and the first gear is engaged with the second gear.

7. The flexible housing according to claim 5, wherein the pivotal part is a multi-axial hinge.

8. The flexible housing according to claim 5, wherein the base further comprises at least one recess to hold the fixing part, the sliding part, a buffer or the pivotal part.

9. The flexible housing according to claim 2, wherein the base and the fixing part are integratedly formed.

10. The flexible housing according to claim 1, wherein the base is a part of a housing of the electronic device.

* * * * *